United States Patent
Lee

(10) Patent No.: US 9,254,844 B2
(45) Date of Patent: Feb. 9, 2016

(54) APPARATUS AND METHOD FOR DRIVING CONTROL OF VEHICLE

(71) Applicant: Hyundai Motor Company, Seoul (KR)

(72) Inventor: Chang Jae Lee, Gyeonggi-do (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/098,379

(22) Filed: Dec. 5, 2013

(65) Prior Publication Data

US 2015/0073659 A1   Mar. 12, 2015

(30) Foreign Application Priority Data

Sep. 12, 2013  (KR) .................. 10-2013-0109860

(51) Int. Cl.
| | |
|---|---|
| *B60W 30/09* | (2012.01) |
| *B60W 10/20* | (2006.01) |
| *G01S 17/93* | (2006.01) |
| *G01S 17/42* | (2006.01) |

(52) U.S. Cl.
CPC ............... *B60W 30/09* (2013.01); *B60W 10/20* (2013.01); *G01S 17/42* (2013.01); *G01S 17/936* (2013.01); *B60W 2550/10* (2013.01)

(58) Field of Classification Search
None
See application file for complete search history.

(56) References Cited

U.S. PATENT DOCUMENTS

2009/0146842 A1   6/2009   Jung

FOREIGN PATENT DOCUMENTS

| JP | 2008-143263 A | 6/2008 |
|---|---|---|
| JP | 2013-037601 A | 2/2013 |
| KR | 10-2007-0036405 A | 4/2007 |
| KR | 10-2009-0042534 A | 4/2009 |
| KR | 10-2011-0062439 A | 6/2011 |
| KR | 10-2012-0036440 A | 4/2012 |
| KR | 10-2013-0057571 A | 6/2013 |
| KR | 10-2013-0078399 A | 7/2013 |

OTHER PUBLICATIONS

Rajkumar, R. (Sep. 5, 2013) Carnegie Mellon's Cadillac SRX Drives Autonomously 33 miles from Cranberry to PIT Airport. Retrieved from https://www.youtube.com/watch?v=SxGY4iH5AAc.*

* cited by examiner

*Primary Examiner* — Mussa A Shaawat
*Assistant Examiner* — Abdhesh Jha
(74) *Attorney, Agent, or Firm* — McDermott Will & Emery LLP

(57) ABSTRACT

An apparatus and a method for driving control of a vehicle include a sensor including a laser sensor disposed in front of the vehicle A controller is configured to calculate a defile width in front of the vehicle based on an angle between a reference segment and an inference segment by recognizing sensing data passing through a reference point at which a virtual standard segment is in contact with the inference segment and a reference segment after confirming a position of an obstacle positioning in front of the vehicle using the sensing data received from the sensor. The controller generates the virtual standard segment for the obstacle based on the confirmed position and generates the inference segment which is perpendicular to the virtual standard segment. An output outputs a driving guide to the calculated defile under control of the controller.

14 Claims, 5 Drawing Sheets

APPARATUS AND METHOD FOR DRIVING CONTROL OF VEHICLE

CROSS-REFERENCE TO RELATED APPLICATION

This application claims the benefit under 35 U.S.C. §119(a) of priority to Korean patent application No. 2013-0109860, filed in the Korean Intellectual Property Office on Sep. 12, 2013, and the entire disclosure of which is hereby incorporated by reference.

TECHNICAL FIELD

The present disclosure relates to an apparatus and a method for driving control of a vehicle, and more particularly, to an apparatus and a method for driving control of a vehicle by modeling a defile existing in front of the vehicle by using a single sensor to recognize the defile.

BACKGROUND

Generally, when a driver drives a vehicle in defile, the driver can use a side mirror of the vehicle or a room mirror mounted in the inside of the vehicle, or can directly use the naked eye to recognize a surrounding situation.

However, if the vehicle moves forward or backward in the defile, there exists a blind spot, in which the driver cannot see the entire surrounding area, in the front or rear sides of the vehicle even while using the side mirror or the rearview mirror or the naked eye. Therefore, a fender bender or damage of the vehicle can occur.

In addition, since many vehicles are parked or stopped in a narrow parking area, such as alleys in residential district, an unexpected defile often exits. Thus, it is difficult to drive vehicles on narrow streets and alleys due to the unexpected defile.

SUMMARY

The present disclosure provides an apparatus and a method for driving control of a vehicle capable of identifying the defile by modeling the defile existing in front of the vehicle by using a single sensor.

In accordance with an aspect of the present disclosure, an apparatus for driving control of a vehicle includes a sensor including a laser sensor disposed in front of a vehicle. A controller is configured to calculate a defile width in front of the vehicle based on an angle between a reference segment and an inference segment by recognizing sensing data passing through a reference point at which a virtual standard segment is in contact with the inference segment and the reference segment, after confirming a position of an obstacle positioned in front of the vehicle using the sensing data received from the sensor. Then, the controller generates the virtual standard segment for the obstacle based on the confirmed position and generates the inference segment which is perpendicular to the virtual standard segment. An output outputs a driving guide to the calculated defile under control of the controller.

The controller recognizes the reference segment as an edge of the obstacle when the angle between the reference segment and the inference segment is less than a threshold.

The controller recognizes the inference segment as the edge of the obstacle when the angle between the reference segment and the inference segment is the threshold or greater.

The standard segment is generated by connecting at least two points at which the sensing data is in contact with the obstacle.

The reference point is any one of both end points of the standard segment.

The controller generates an inference point in a side of the obstacle based on the reference point. The inference segment is generated by connecting the reference point with the inference point.

The controller calculates the defile width by using a distance between reference points for at least two obstacles and a distance between the inference points when the angle is the threshold or greater. The controller then selects specific points in the reference segment and calculates the defile width by using a distance between the specific points and the distance between the reference points when the angle is less than the threshold.

In accordance with another aspect of the present disclosure, a method for driving control of a vehicle includes receiving, by a controller, sensing data from a sensor including a laser sensor in front of the vehicle. The controller confirms an obstacle positioned in front of the vehicle by using the sensing data. The controller generates a virtual standard segment for the obstacle based on the confirmed position and recognizes the sensing data passing through any one of both end points of the virtual standard segment as a reference segment. The controller then generates an inference segment which is perpendicular to the virtual standard segment and confirms an angle between the reference segment and the inference segment. Further, the controller calculates a defile width in front of the vehicle based on the confirmed angle, and outputs a driving guide to the defile having the calculated width.

After the confirming of the angle between the reference segment and the inference segment, the method for driving control of a vehicle further includes recognizing the reference segment as an edge of the obstacle when the angle is less than a threshold, and recognizing the inference segment as the edge of the obstacle when the angle is the threshold or greater.

The generating of the virtual standard segment includes generating the virtual standard segment by connecting at least two points at which the sensing data is in contact with the obstacle.

After the generating of the virtual standard segment, the method for driving control of a vehicle further includes defining any one of both end points of the standard segment as a reference point.

The generating of the inference segment includes generating an inference point in a side of the obstacle based on the reference point, and generating the inference segment by connecting the reference point with the inference point.

The calculating of the defile width in front of the vehicle includes calculating the defile width by using a distance between the reference points for at least two obstacles and a distance between the inference points when the angle is the threshold or greater. Specific points are selected in the reference segment for at least two obstacles and the defile width is calculated by using a distance between the specific points and the distance between the reference points when the angle is less than the threshold.

BRIEF DESCRIPTION OF THE DRAWINGS

The objects, features, and advantages of the present disclosure will be more apparent from the following detailed description in conjunction with the accompanying drawings.

DETAILED DESCRIPTION OF EMBODIMENTS

Embodiments of the present disclosure are described with reference to the accompanying drawings in detail. The same reference numbers are used throughout the drawings to refer to the same components. Detailed descriptions of well-known functions and structures incorporated herein may be omitted to avoid obscuring the subject matter of the present disclosure.

Figure 1:
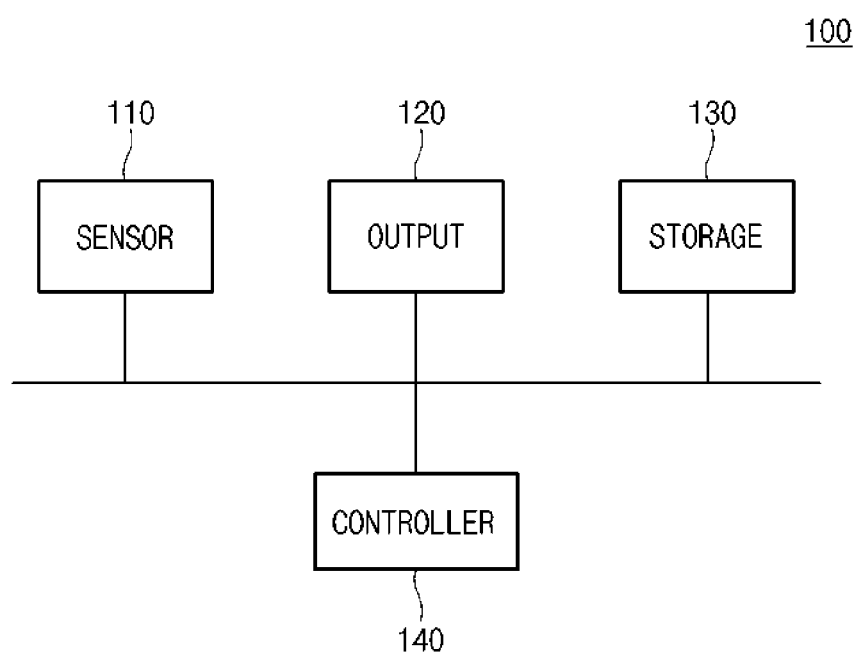
FIG. 1 is a block diagram illustrating a main configuration of an apparatus for driving control of a vehicle according to an embodiment of the present disclosure.

FIG. 1 is a block diagram illustrating a main configuration of an apparatus for driving control of a vehicle according to an embodiment of the present disclosure. FIGS. 2 to 4D are diagrams for explaining a method for recognizing a defile according to an embodiment of the present disclosure.

Figure 4A:
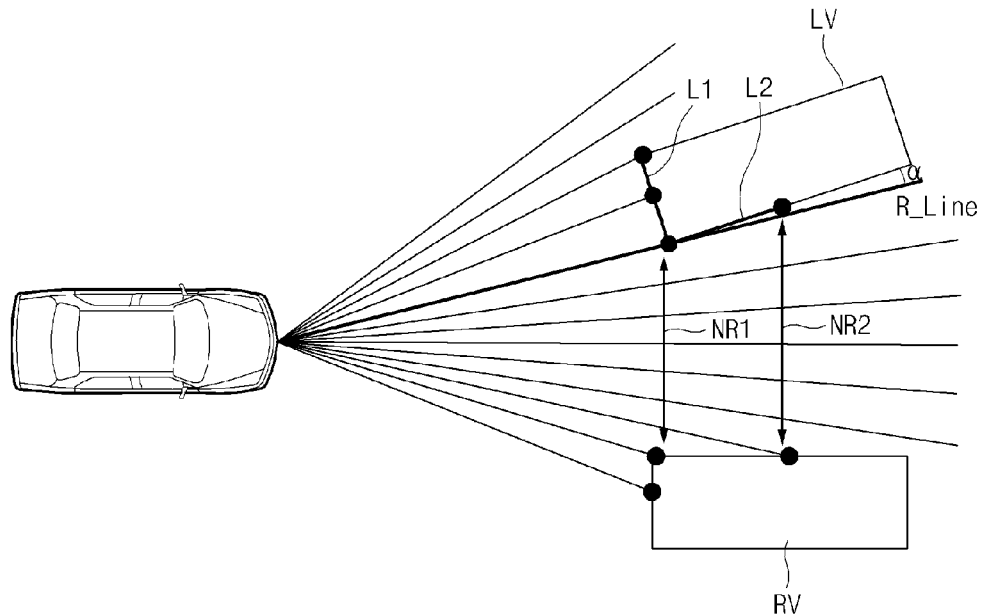
Figure 4B:
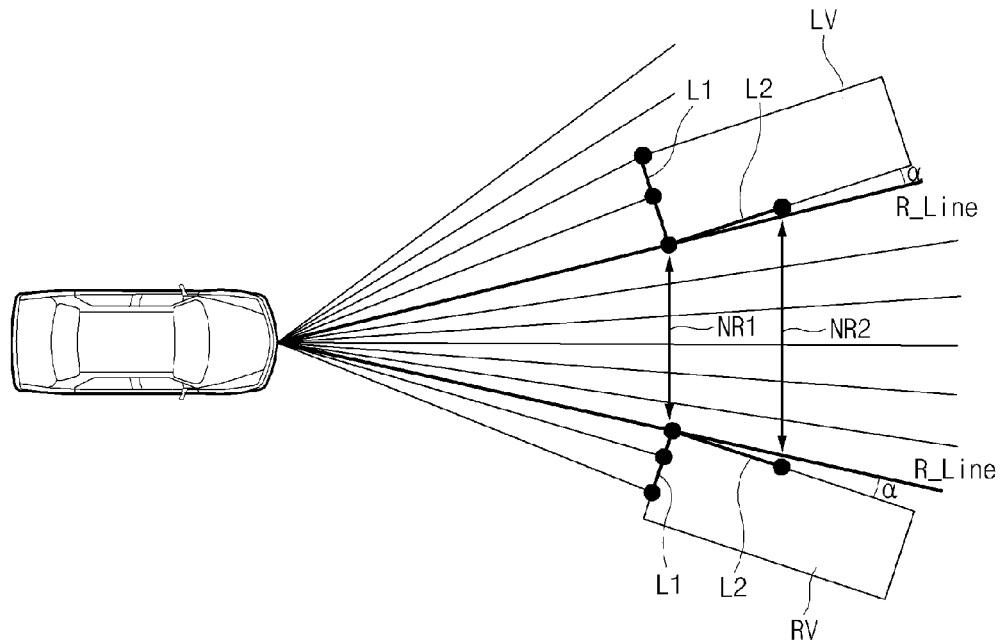
Figure 4C:
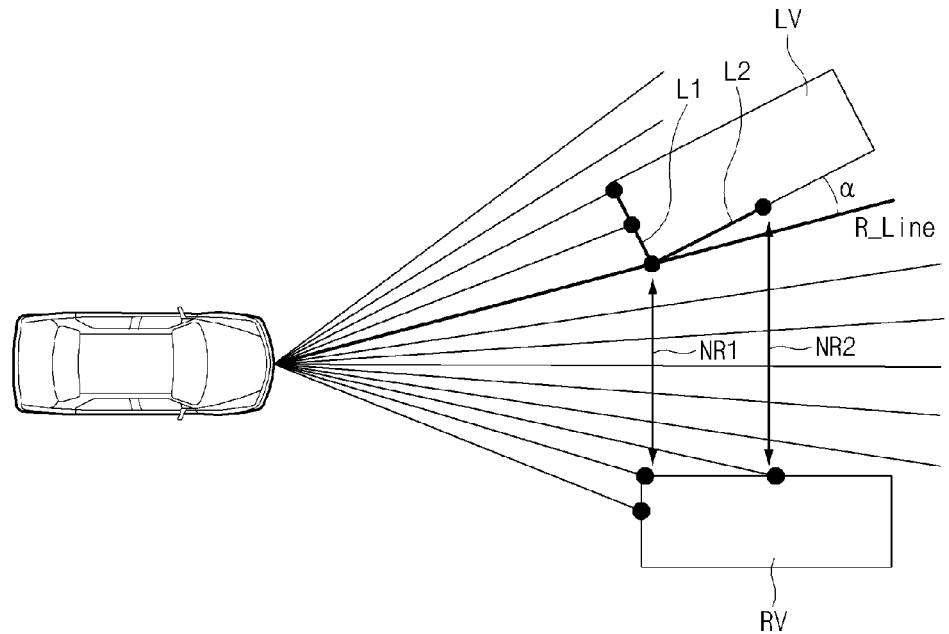
Figure 4D:
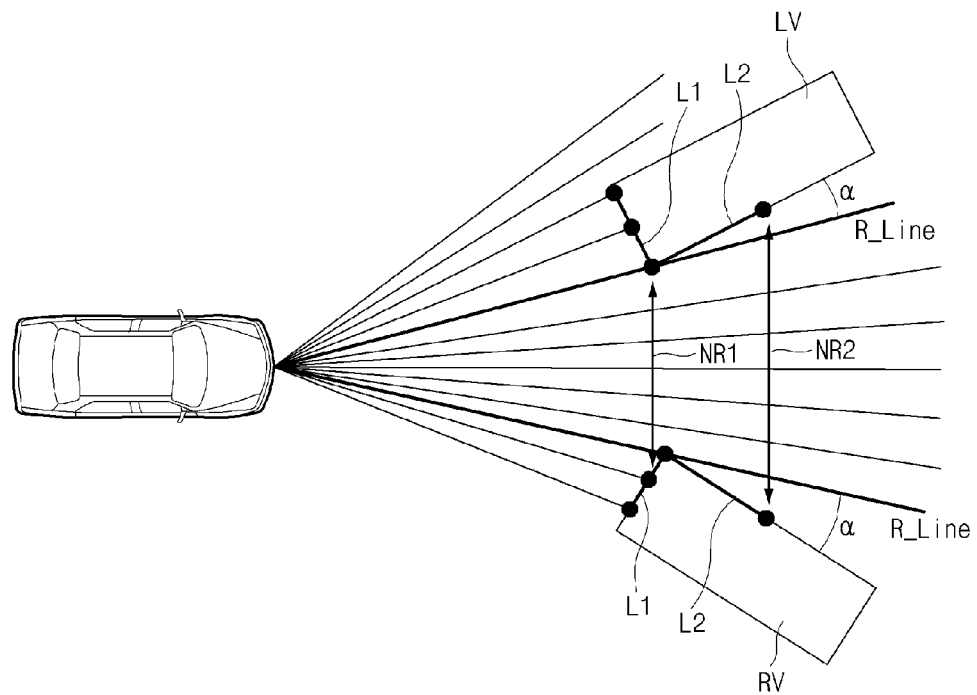

Referring to FIGS. 1 and 4D, an apparatus 100 for driving control according to an embodiment of the present disclosure includes a sensor 110, an output 120, a storage 130, and a controller 140.

The sensor 110 includes one sensor disposed in front of a vehicle and transmits sensing data to the controller 140. The sensor 110 may include a laser radar which is a light detection and ranging (LiDAR) sensor. Since the LiDAR sensor has a significantly high recognition rate in a longitudinal direction and a transverse direction, it is less likely to produce a recognition error of an obstacle which is close to the vehicle. Thus, it is possible to accurately recognize a state of a road. The sensor provided in the vehicle is not limited to the LiDAR sensor, but various sensors may be used. In addition, the sensor 110 includes a camera sensor to obtain image data of the front of the vehicle.

The output 120 outputs the image data for a current position of the vehicle and a message for a driving guide to the defile under control of the controller 140. Therefore, it is possible to secure vehicle safety during driving in the defile and reduce a burden of driver to pass the defile.

The storage 130 stores the image data obtained from the camera sensor, a program for determining the defile, and various programs for controlling the apparatus 100 for driving control under control of the controller 140.

The controller 140 confirms the position of the obstacle positioned in front of the vehicle by using the sensing data received from the sensor 110, generates a virtual standard segment for the obstacle based on the confirmed position, and generates an inference segment which is perpendicular to the virtual standard segment. Then the controller 140 calculates a defile width in front of the vehicle based on an angle between the virtual standard segment and the inference segment by recognizing the sensing data passing through a reference point at which the virtual standard segment is in contact with the inference segment and a reference segment.

In more detail, the controller 140 receives the sensing data obtained from the laser radar through the sensor 110 provided in front of an own vehicle and confirms whether the obstacle (hereinafter, referred to as other vehicle) exists in front of the own vehicle by analyzing the received sensing data. The controller 140 confirms the position in which the other vehicle is sensed when the other vehicle is sensed in front of the own vehicle and generates measuring points using a plurality of points at which the sensing data contact with the other vehicle. The measuring points may be represented by reference numerals a to f in FIGS. 2 and 3. The controller 140 generates a standard segment L1 by connecting the reference numerals a to c in FIG. 2 and a standard segment L1 by connecting the reference numerals e to f in FIG. 3.

Figure 2:
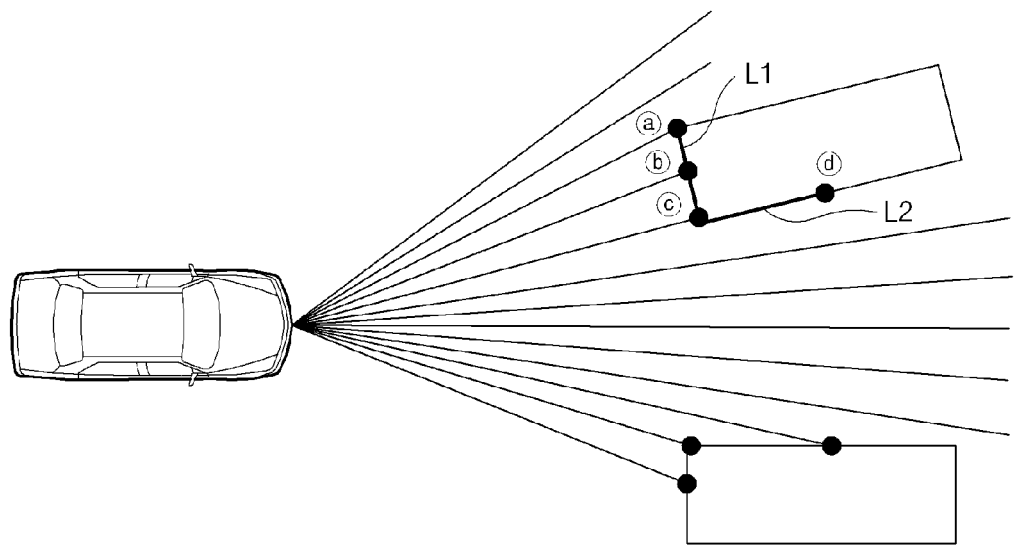
FIGS. 2 to 4D are diagrams for explaining a method for recognizing a defile according to an embodiment of the present disclosure.
Figure 3:
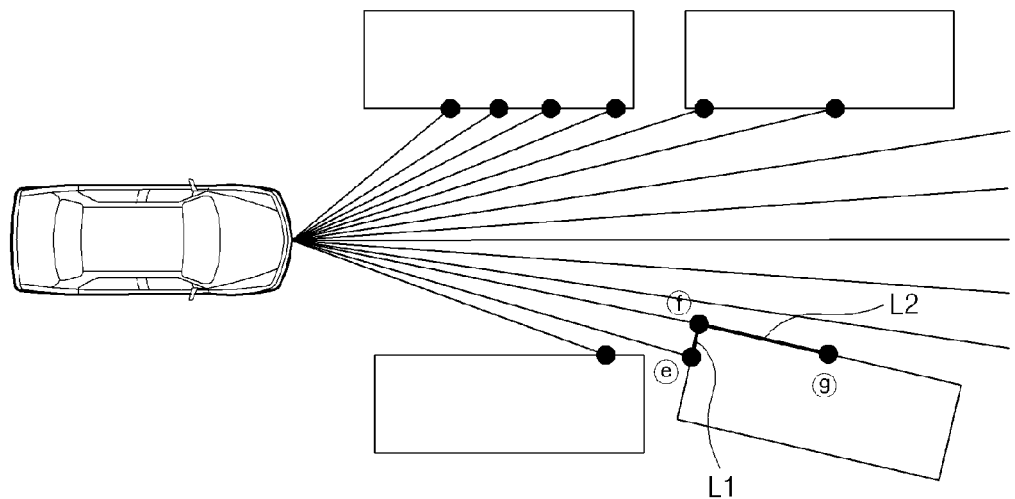

The controller 140 defines the point which is positioned at the rightmost portion or the leftmost portion as a reference point among the measuring points configuring the L1. Referring to FIG. 2, since the other vehicle exists in left-front of the own vehicle, the controller 140 defines the reference numeral c which is the rightmost point in the L1, as the reference point. Referring to FIG. 3, since the other vehicle exists in right-front of the own vehicle, the controller 140 defines the reference numeral f which is the leftmost point in the L1 as the reference point.

The controller 140 extracts the sensing data passing through the defined reference point and recognizes a virtual path formed by the sensing data as a reference segment R_Line. FIGS. 4A to 4D show the recognizing of the reference segment. The controller 140 generates a side inference point of the other vehicle. The side inference point infers the edge of the other vehicle positioned in front of the own vehicle. The inference point corresponds to the reference numeral d in FIG. 2 and the reference numeral g in FIG. 3.

The controller 140 generates an inference segment by connecting the reference point with the inference point. The inference segment corresponds to the reference numeral L2 in FIGS. 2 and 3. After confirming an angle between the reference segment R_Line and the inference segment L2, the controller 140 recognizes that the reference segment R_Line is the edge of the other vehicle when the angle is less than 0.25 degrees and the inference segment L2 is the edge of the other vehicle when the angle is 0.25 degrees or greater.

As shown in FIG. 4A, when the own vehicle is not in parallel with the other vehicle LV positioned in left-front of the own vehicle, and the own vehicle is in parallel with the other vehicle RV positioned in right-front of the own vehicle, the controller 140 confirms an angle that is formed by the LV and the own vehicle, i.e., an angle α between the inference segment L2 of the LV and the reference segment R_Line for the LV. As the confirmation result, when the angle α is less than 0.25 degree, the controller 140 recognizes that the reference segment R_Line is the edge of the LV. The controller 140 extracts a distance NR1 between the reference points of each of the LV and RV vehicles and a distance NR2 between the reference segment R_Line for the LV and the edge of the RV to calculate the defile width. In this case, the NR1 and the NR2 may be in parallel with each other, and may be generated without being inclined toward any side.

In addition, as shown in FIG. 4B, when the LV and the RV are not in parallel with the own vehicle, the controller 140 confirms the angle between the inference segment L2 and the reference segment R_Line for the LV and the RV, respectively. If the confirmed angle is less than 0.25 degree, the controller 140 calculates the defile width by extracting the distance between the reference segments R_Line for the LV and RV. The NR1 may be calculated by connecting the referent points of the LV and the RV. However, if the NR1 is inclined toward one side, the controller 140 may generate the NR1 without being inclined by extracting a specific point from the referent segment R_Line. The controller 140 extracts the points which are in parallel with the NR1 from the reference segments R_Line for each of the LV and the RV to generate a distance NR2 between the extracted points.

As shown in FIG. 4C, when the LV is not in parallel with the own vehicle, and the RV is in parallel with the own vehicle, the controller 140 confirms an angle that is formed by the LV and the own vehicle, i.e., an angle α between the inference segment L2 of the LV and the reference segment R_Line for the LV. If the angle α is 0.25 degree or more, the controller 140 recognizes that the inference segment L2 is the edge of the LV. The controller 140 extracts the distance NR1 between the reference points for each of the LV and RV vehicles and the distance NR2 between the inference segment L2 of the LV and the edge of the RV to calculate the defile width. In this case, the NR1 and the NR2 may be in parallel with each other and may be generated without being inclined toward any side.

As shown in FIG. 4D, when the angle, which is formed by the inference segments L2 and the reference segments R_Line for the LV and RV, is 0.25 degree or greater, the controller 140 calculates the defile width by extracting the distance between the inference segments L2 of each of the LV and the RV. Here, the NR1 may be calculated by connecting the reference points of the LV and the RV, and the NR2 may be calculated by connecting the inference points of the LV and the RV. However, when generating the NR1 or the NR2 by connecting the reference points or the inference points of the LV and the RV, if the NR1 or the NR2 is inclined toward one side, the controller 140 may newly generate the NR1 and the NR2 by extracting a point which is perpendicular to the LV and the RV in the inference segment L2.

The controller 140 calculating the defile width by using the method as described above outputs the image data and the message for the driving guide to the defile through the output 120.

Figure 5:
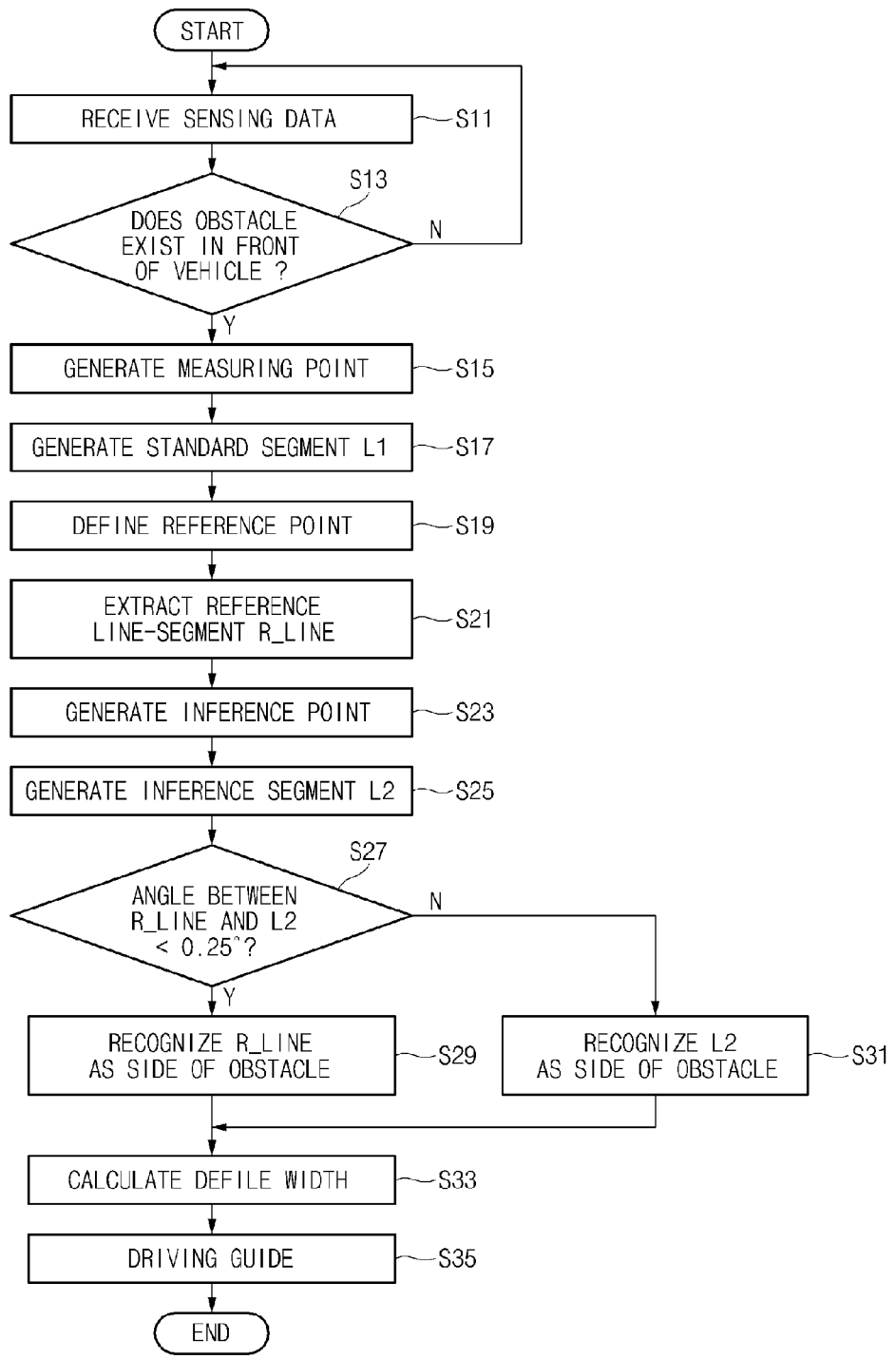
FIG. 5 is a flow chart illustrating a method for driving control of a vehicle according to an embodiment of the present disclosure.

FIG. 5 is a flow chart illustrating a method for driving control of a vehicle according to an embodiment of the present disclosure.

Referring to FIGS. 2 to 5, at step S11, the controller 140 receives sensing data obtained from a laser radar through the sensor 110 disposed in front of the own vehicle.

At step S13, the controller 140 confirms whether an obstacle (hereinafter, referred to as other vehicle) exists in front of the own vehicle by analyzing the sensing data. The controller 140 may confirm whether the other vehicle exists in left or right front of the own vehicle by analyzing the sensing data. According to the result confirmed at step S13, the controller 140 proceeds to step S15 when the other vehicle exists in front of the own vehicle, and the controller 140 returns to step S11 when the other vehicle does not exist in front of the own vehicle.

At step S15, the controller 140 generates a plurality of measuring points using contact points at which the sensing data contact with the other vehicle. The measuring points correspond to reference numerals a to c in FIG. 2 and to reference numerals e to f in FIG. 3.

At step S17, the controller 140 generates a standard segment L1 by connecting the plurality of generated measuring points.

At step S19, the controller 140 defines the rightmost or the leftmost point of the standard segment L1 as a reference point. In this case, when the other vehicle exists in the left front of the own vehicle, the controller 140 defines the rightmost point of the standard segment L1 corresponding to the reference numeral c in FIG. 2 as the reference point. On the other hand, when the other vehicle exists in right front of the own vehicle, the controller 140 defines the leftmost point of the standard segment L1 corresponding to the reference numeral f in FIG. 3 as the reference point.

At step S21, the controller 140 extracts the sensing data passing through the reference point among the sensing data and recognizes the extracted sensing data as the reference segment R_Line.

At step S23, the controller 140 generates a side inference point of the other vehicle. The inference point corresponds to the reference numeral d in FIG. 2 and the reference numeral g in FIG. 3. The inference point may be generated on the premise that the other vehicle is a square or rectangle based on the reference point.

At step S25, the controller 140 generates an inference segment L2 by connecting the reference point defined at step S19 with the inference point generated at step S23. The inference segment L2 here corresponds to the reference numeral L2 in FIGS. 2 and 3.

At step S27, after confirming whether an angle between the reference segment R_Line recognized at step S21 and the inference segment L2 generated at step S25 is less than 0.25 degree, the controller 140 proceeds to step S31 when the angle is 0.25 degree or greater and to step S29 when the angle is less than 0.25 degree.

At step S29, the controller 140 recognizes the reference segment R_Line as an edge of the other vehicle and proceeds to step S33. On the contrary, at step S31, the controller 140 recognizes the inference segment L2 as the edge of the other vehicle when the angle is 0.25 degree or greater and proceeds to step S33.

At step S33, the controller 140 calculates a defile width based on the recognized edge of the other vehicle. Since the calculating of the defile width has been described in detail in the above, a description will be omitted.

At step S35, the controller 140 outputs image data and a message for a driving guide based on the calculated defile width through an output 120.

As set forth above, the present disclosure can identify the defile by modeling the defile existing in front of the vehicle by using the single sensor.

Although embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. An apparatus for driving control of a vehicle, the apparatus comprising:
   a sensor including a laser sensor disposed in front of the vehicle;
   a controller configured to calculate a defile width in front of the vehicle based on an angle between a reference segment and an inference segment by recognizing sensing data passing through a reference point at which a virtual standard segment is in contact with the inference segment and the reference segment, after confirming a position of an obstacle positioned in front of the vehicle using the sensing data received from the sensor, generate the virtual standard segment for the obstacle based on the confirmed position, and generate the inference segment which is perpendicular to the virtual standard segment; and
   an output outputting a driving guide to the calculated defile under control of the controller.

2. The apparatus of claim 1, wherein the controller recognizes the reference segment as an edge of the obstacle when the angle between the reference segment and the inference segment is less than a threshold.

3. The apparatus of claim 2, wherein the controller recognizes the inference segment as the edge of the obstacle when the angle between the reference segment and the inference segment is the threshold or greater.

4. The apparatus of claim 3, wherein the virtual standard segment is generated by connecting at least two points at which the sensing data is in contact with the obstacle.

5. The apparatus of claim 4, wherein the reference point is any one of both end points of the virtual standard segment.

6. The apparatus of claim 5, wherein the controller generates an inference point in a side of the obstacle based on the reference point.

7. The apparatus of claim 6, wherein the inference segment is generated by connecting the reference point with the inference point.

8. The apparatus of claim 7, wherein the controller calculates the defile width by using a distance between the reference points for at least two obstacles and a distance between the inference points when the angle is the threshold or greater, and the controller selects specific points in the reference segment and calculates the defile width by using a distance between the specific points and the distance between the reference points when the angle is less than the threshold.

9. A method for driving control of a vehicle, the method comprising:
receiving, by a controller, sensing data from a sensor including a laser sensor in front of the vehicle;
confirming, by the controller, an obstacle positioned in front of the vehicle by using the sensing data;
generating, by the controller, a virtual standard segment for the obstacle based on a confirmed position;
recognizing, by the controller, sensing data passing through any one of both end points of the virtual standard segment as a reference segment;
generating, by the controller, an inference segment which is perpendicular to the virtual standard segment;
confirming, by the controller, an angle between the reference segment and the inference segment;
calculating, by the controller, a defile width in front of the vehicle based on the confirmed angle; and
outputting, by the controller, a driving guide to the defile having the calculated width.

10. The method of claim 9, after the confirming of the angle between the reference segment and the inference segment, recognizing the reference segment as an edge of the obstacle when the angle is less than a threshold, and recognizing the inference segment as the edge of the obstacle when the angle is the threshold or greater.

11. The method of claim 10, wherein the generating of the virtual standard segment comprises generating the virtual standard segment by connecting at least two points at which the sensing data is in contact with the obstacle.

12. The method of claim 11, after the generating of the virtual standard segment, further comprising defining any one of both end points of the virtual standard segment as a reference point.

13. The method of claim 12, wherein the generating of the inference segment comprises generating an inference point in a side of the obstacle based on the reference point, and generating the inference segment by connecting the reference point with the inference point.

14. The method of claim 13, wherein the calculating of the defile width in front of the vehicle comprises:
calculating the defile width by using a distance between reference points for at least two obstacles and a distance between the inference points when the angle is the threshold or greater; and
selecting specific points in the reference segment for at least two obstacles and calculating the defile width by using a distance between the specific points and the distance between the reference points when the angle is less than the threshold.

* * * * *